United States Patent [19]

Maxson et al.

[11] Patent Number: 5,059,649

[45] Date of Patent: Oct. 22, 1991

[54] STORAGE STABLE ONE-PART FLUOROSILICONE GEL COMPOSITIONS EXHIBITING IMPROVED THERMAL STABILITY

[75] Inventors: Myron T. Maxson; Bernard VanWert, both of Midland, Mich.

[73] Assignee: Dow Corning Corporation, Midland, Mich.

[21] Appl. No.: 433,300

[22] Filed: Nov. 8, 1989

[51] Int. Cl.$^5$ ............... B01J 13/00; C08K 5/04; C08K 5/09

[52] U.S. Cl. ............... 524/398; 252/183.12; 252/315.1

[58] Field of Search ............... 252/183.12, 315.1; 528/15, 19; 524/398

[56] References Cited

U.S. PATENT DOCUMENTS

| | | | |
|---|---|---|---|
| 3,020,260 | 2/1962 | Nelson | 528/15 |
| 3,867,343 | 2/1975 | Garden | 528/15 |
| 3,933,882 | 1/1976 | Lee et al. | 528/15 X |
| 4,072,635 | 2/1978 | Jeram | 528/15 X |
| 4,281,093 | 7/1981 | Garden | 528/15 |
| 4,465,805 | 8/1984 | Blizzard et al. | 528/15 X |
| 4,719,275 | 1/1988 | Benditt et al. | 528/15 |
| 4,898,903 | 2/1990 | Rasch et al. | 524/398 |

*Primary Examiner*—Richard D. Lovering
*Attorney, Agent, or Firm*—Robert Spector

[57] ABSTRACT

Concentration levels of copper acetylacetonate previously considered ineffective inhibit or eliminate thermally induced hardening of fluorosilicone gels prepared by a hydrosilylation reaction using one-part curable compositions containing an N,N,N',N'-tetraalkyl alkylenediamine as a catalyst inhibitor. This inhibitor can be used alone or in combination with acetylenic alcohols such as methylbutynol to modify the curing characteristics of the composition and/or the properties of the cured gel.

2 Claims, No Drawings

STORAGE STABLE ONE-PART FLUOROSILICONE GEL COMPOSITIONS EXHIBITING IMPROVED THERMAL STABILITY

BACKGROUND OF THE INVENTION

1. Field of the Invention

This invention relates to storage stable polyorganosiloxane compositions. More particularly, this invention relates to one part fluorosilicone compositions curable by a platinum catalyzed hydrosilation reaction. The compositions contain an synergistic combination of 1) an amine type catalyst inhibitor that imparts long term storage stability to one-part curable compositions without interfering with curing of the composition at temperatures of at least 100° C. and 2) an additive that provides long-term resistance to heat-induced hardening of the cured gel. Using this additive at prior art levels results in excessive hardening and discoloration of the gel.

2. Description of Background Art

Polyorganosiloxane compositions that cure by means of a platinum catalyzed hydrosilation reaction to form silicone gels are disclosed, for example, in U.S. Pat. No. 3,020,260, issued to Nelson on Feb. 6, 1962, and in U.S. Pat. No. 4,719,275, issued to, Benditt and Maxson on Jan. 12, 1988. The gels described by Nelson are obtained by reacting an organosiloxane containing two silicon-bonded hydrogen atoms per molecule with a vinyl-containing copolymer wherein the repeating units are of the formulae $RViSiO$, $R_2SiO$, and $CH_3R_2SiO_{0.5}$, R is methyl or phenyl and Vi represents vinyl.

Benditt and Maxson teach preparing a fluorosilicone gel by reacting a polydiorganosiloxane containing fluorinated hydrocarbon radicals bonded to silicon and 2 vinyl or other ethylenically unsaturated radicals per molecule with an organohydrogensiloxane containing at least three silicon-bonded hydrogen atoms per molecule.

It is known that inhibitors for platinum catalyzed hydrosilation reactions can be added to curable fluorosilicone gel compositions such as those of Benditt and Maxson to increase their working time at room temperature, however, these inhibitors also decrease the rate at which these compositions cure at temperatures above about 100° C. While known inhibitors will partially suppress the reactivity of catalyzed compositions containing both vinyl radicals and silicon-bonded hydrogen atoms, these compositions cannot be stored for extended time periods under ambient conditions without either undergoing a substantial increase in viscosity or curing to form a solid gel.

The viscosity of commercially useful one-part curable organosiloxane gel compositions should not increase by more than about 100% during the several weeks that can elapse between the time the composition is prepared and the time at which it is desired to cure the composition. During this period the compositions are stored in locations where the ambient temperature may reach 50° C.

A concurrently filed and copending application naming the same two inventors as the present application is directed to one-part curable fluorosilicone gel compositions of the type described in the aforementioned Benditt and Maxson patent. These one-part compositions meet the foregoing stability requirements for commercially useful materials. The unique feature of these compositions is the presence of a specified group of N,N,N',N'-tetraalkylene diamines as inhibitors for the platinum-containing hydrosilylation catalyst that promotes curing of the compositions.

One of the references discussed in the Background section of the aforementioned copending application is U.S. Pat. No. 3,867,343, which issued to Garden on Feb. 18, 1975. This reference teaches using ammonia, amines and other nitrogen-containing compounds as inhibitors for the platinum catalyzed reaction of silicon-bonded hydrogen atoms with silicon-bonded hydroxyl groups. U.S. Pat. No. 4,281,093, issued to Garden on July 28, 1981, discloses using these inhibitors for the reaction of polyorganosiloxanes containing silicon-bonded hydrogen atoms with polyorganosiloxanes containing silicon-bonded hydroxyl, vinyl or allyl groups. The catalysts for the reaction are organometallic complexes of platinum or rhodium. The longest gel time, i.e., time required for gelling of the reaction mixture at 25° C., reported in U.S. Pat. No. 3,867,343 is 2409 minutes, equivalent to 40.15 hours, and is obtained using alpha-dipyridyl. This value does not take into account the increase in viscosity that typically occurs prior to complete gelation. The viscosity increase could render the composition unsuitable for commercial use as a one-part composition considerably prior to the time gelation occurred.

N,N,N',N'-tetramethylethylenediamine was considerably less effective as an inhibitor than alpha-dipyridyl, imparting a gel time of 1533 minutes (25.5 hours).

One of the shortcomings of the cured fluorosilicone gels described in the aforementioned copending application and the Benditt and Maxson patent is the tendency of the cured gel to undergo additional hardening when exposed to temperatures above about 125° C. for prolonged periods of time.

Copending application Ser. No. 322,865, (now U.S. Pat. No. 4,898,903) filed on Mar. 14, 1989 in the names of Lawrence Fiedler and Diane Rasch and assigned to the same entity as the present application teaches adding up to 0.1 weight percent of copper acetylacetonate to curable fluorosilicone gel compositions of the type disclosed in the aforementioned Benditt and Maxson patent to suppress heat-induced hardening of the cured gel. Applicants attempted to apply the teaching of Fiedler and Rasch to one-part curable fluorosilicone gel compositions containing from 10 to about 100 parts per million (ppm), based on the weight of the curable composition of an N,N,N',N'-tetraalkylene diamine in addition to or in place of the acetylenic alcohols conventionally used to extend the storage life and/or working time of organosiloxane compositions that cure by a platinum-catalyzed hydrosilylation reaction. Applicants discovered that at the concentration range of copper acetylacetonate taught by Fiedler and Rasch the cured gels were unacceptably dark in color and too hard for many intended end use applications, including coatings and encapsulants for fragile electronic devices such as integrated circuits. The gel must remain relative soft to provide the required protection without damaging the delicate leads and other exposed parts of the device. In some applications, particularly in automotive industry, the devices are located in the engine compartment where the temperature can reach 150° C. or above.

One objective of this invention is to increase the resistance to thermally induced hardening of cured fluorosilicone gels prepared from compositions described in the aforementioned copending Maxson and Vanwert application without causing unacceptable discoloration or otherwise adversely affecting the appearance and/or properties of the gel.

SUMMARY OF THE INVENTION

The present invention is based on the discovery that concentration levels of copper acetylacetonate considered ineffective by the prior art will effectively retard thermally induced hardening of fluorosilicone gels prepared by a hydrosilylation reaction using curable compositions containing an N,N,N',N'-tetraalkyl alkylenediamine as a catalyst inhibitor. This is achieved without adversely affecting the electrical properties of the cured gel. The catalyst inhibitor can be used alone or in combination with acetylenic alcohols such as methylbutynol to modify the curing characteristics of the composition and/or the properties of the cured gel.

Coatings and other thin layers formed from the present compositions cure in from 15 to 60 minutes at 150° C. without discoloration.

DETAILED DESCRIPTION OF THE INVENTION

This invention provides a one-part liquid fluorosilicone composition that cures to a gel by means of a platinum-catalyzed hydrosilylation reaction when heated, is stable for prolonged periods of time at temperatures up to 50° C. and consists essentially of the product obtained by blending A. a liquid diorganovinylsiloxy terminated polydiorganosiloxane wherein at least 25 percent of the silicon atoms are bonded to a fluorine-containing hydrocarbon radical;

B. a compatible liquid organohydrogensiloxane containing an average of more than two silicon bonded hydrogen atoms per molecule in an amount sufficient to provide a molar ratio of silicon bonded hydrogen atoms to vinyl radicals in said composition of from 0.4 to about 1.0;

C. an amount sufficient to promote curing of said composition of a platinum-containing catalyst; and D. an amount of at least one N,N,N',N'-tetraalkyl alkylenediamine sufficient to inhibit curing of said composition in bulk form at temperatures up to 50° C. without impairing the ability of said composition to cure at temperatures above 100° C., where the alkyl portion of the diamine contains from 1 to 4 carbon atoms, and the alkylene portion contains from 2 to 4 carbon atoms.

The improvement comprises the presence in said curable composition of copper acetylacetonate at a concentration sufficient to inhibit discoloration and heat-induced hardening of cured gels formed from said composition, where said copper acetylacetonate constitutes less than 0.02 percent of the total weight of said composition.

The novelty of the present curable compositions resides in the presence of copper acetylacetonate at a concentration of less than 0.02 weight percent in combination with a catalyst-inhibiting amount of one of the present alkylene diamines. This combination surprisingly suppresses discoloration and thermally induced hardening of fluorosilicone gels prepared by curing the compositions of this invention, which encompass but are not limited to the compositions disclosed in the aforementioned patent issued to Benditt and Maxson.

Concentrations of up to 0.01 percent, based on the weight of the curable composition, of copper acetylacetonate are effective. The present inventors discovered that higher concentrations of this ingredient will cause excessive hardening and discoloration of the thermally cured gel.

The combination of the present amine inhibitors with a concentration of copper acetylacetonate within the range taught in the aforementioned Rasch and Fiedler application appears synergistic with respect to the hardness of the cured gel. The accompanying examples demonstrate the ability of this combination to cure fluorosilicone gel compositions wherein the molar ratio of silicon-bonded hydrogen atoms to vinyl radicals is too low to yield a cured gel using either of these additives alone. The disadvantage of these compositions is the discoloration and excessive hardness of the cured gel.

Less than about 0.001 weight percent of copper acetylacetonate in the present compositions typically may not provide a significant reduction in heat-induced hardening of the gel at temperatures of 100° C. and above.

The concentration of copper acetylacetonate in the present compositions is preferably from 0.003 to about 0.007 percent, based on the total weight of the curable composition.

The Platinum Catalyst Inhibitor

The diamine inhibitors of this invention are used in combination with copper acetylacetonate to achieve the desired combination of a gel that does not harden significantly or discolor during a 1000 hour exposure to a temperature of 150° C.

The present N,N,N',N'-tetraalkyl alkylenediamines correspond to the general formula $R^1_2NR^2NR^1_2$ where $R^1$ represents an alkyl radical containing from 1 to 4 carbon atoms and $R^2$ represents an alkylene radical containing from 2 to 4 carbon atoms. Preferably all of the $R^1$ radicals are methyl, $R^2$ is ethylene and the inhibitor is N,N,N',N'-tetramethylethylenediamine.

Using this preferred inhibitor, thin layers containing less than about one gram or less per square centimeter cure in 60 minutes or less at 150° C. Larger amounts of the compositions, i.e. about 50 gram portions, are stable for at least three months at 50° C. and cure in about 4 hours at 150° C.

The concentration of inhibitor will affect the long-term storage stability of the composition and the time required to cure coatings and other thin layers formed from the composition when the layers are exposed to temperatures of at least 100° C. Concentrations as low as 1 part by weight per one million parts by weight of total composition (ppm) are useful when the storage period is relatively short, typically in the order of several hours, and a rapid cure is desired.

As the inhibitor concentration is increased to an upper limit of about 100 parts per one million parts of composition, storage stability under ambient conditions improves with a corresponding increase in the cure time of thin layers formed from these compositions. The concentration of a specific inhibitor that will satisfy the requirements for a particular end use application can readily be determined with a minimum of experimentation. The concentration range for the present inhibitors is preferably from 1 up to about 40 ppm.

The inhibitor concentration is relatively low, and has been found critical to achieving the desired storage stability and cure rate. To ensure accuracy and reproducibility in the addition of inhibitor, it may be desirable to dilute the inhibitor in an inert liquid that is miscible with the other ingredients of the curable compositions. Liquid cyclic- and trimethylsiloxy terminated polymethyl-3,3,3-trifluoropropylsiloxanes are preferred diluents.

Applicants have discovered that the amine inhibitors described hereinbefore are quite selective, and are effective only in combination with a relatively small class of fluorosilicone compositions when these compositions are applied as thin layers such as coatings and encapsulants.

The present class of catalyst inhibitors is particularly suitable for use with the curable fluorosilicone gel compositions described in the aforementioned U.S. Pat. No. 4,719,275 to Benditt and Maxson.

The amine inhibitors of this invention can be used alone to control the activity of platinum-containing hydrosilylation catalysts. The present inventor discovered that additional beneficial results are achieved when these inhibitors are combined with the acetylenic alcohols used as inhibitors in prior art organosiloxane compositions. The concentration of these alcohols in the present compositions can be from 10 to about 1000 ppm. A concentrations of from 100 to about 500 ppm is particularly preferred.

Acetylenic alcohols that can be advantageously combined with the present amine inhibitors include but are not limited to methylbutynol and ethynylcyclohexanol.

The acetylenic alcohol increases the storage stability of the present compositions and reduces the hardness of the cured gel relative to the values obtained using the same concentration of amine in the absence of the acetylenic alcohol. While not wishing to be bound by any theory, this effect is believed due to a reaction between the acetylenic alcohol and a small amount of the organohydrogensiloxane present in the curable organosiloxane composition.

The Vinyl-Terminated Polydiorganosiloxane (Ingredient A)

Ingredient A can be either a homopolymer or a copolymer and is represented by the general formula

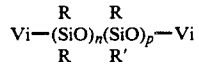

where R represents a monovalent hydrocarbon radical, R' represents the radical RfCH$_2$CH$_2$— where Rf represents a monovalent perfluorinated hydrocarbon radical containing from 1 to about 5 carbon atoms, Vi represents a vinyl radical, the sum of n and p typically represents a molecular weight equivalent to a viscosity of from 0.2 to 100 Pa.s at 25° C. and the value of n can be from 0 to 3 p.

The radical represented by R can contain from 1 to about 20 carbon atoms. A range of from 1 to 10 carbon atoms is preferred based on the availability of the corresponding cyclic diorganosiloxanes used to prepare ingredient A. Preferably R is methyl, phenyl or a combination of methyl and phenyl and R' is 3,3,3-trifluoropropyl. Most preferably all of the radicals represented by R are methyl and the value of n is 0.

Ingredient A is represented in the foregoing formula as a linear molecule. It will be understood, however, that in reality some of the molecules may contain branched units resulting from small amounts of trifunctional reactants present as impurities in the cyclic diorganosiloxanes used to prepare the polydiorganosiloxane (ingredient A).

Ingredient A can be a single polydiorganosiloxane species or a mixture containing two or more polydiorganosiloxanes of different molecular weights, so long as the viscosity of the mixture is within the aforementioned limits.

Ingredient A can be prepared using any of the known methods for preparing vinyl-terminated polydiorganosiloxanes. A preferred method is by the ammonia-catalyzed polymerization of the corresponding cyclic diorganosiloxane(s) to form a silanol-terminated polydiorganosiloxane. This method is described in U.S. Pat. No. 4,683,277, which issued to M. T. Maxson on July 28, 1987.

The reactant used to convert the silanol terminated polydiorganosiloxane to a vinyl terminated polymer should be capable of reacting in the presence of relatively weak catalysts such as ammonia. Hexaorganodisilazanes wherein each of the two silicon atoms is bonded to a vinyl radical will react under these conditions and are therefore the reactants of choice for preparing the fluorinated polydiorganosiloxanes referred to hereinafter as ingredient A.

Methods for polymerizing cyclic diorganosiloxanes to liquid silanol terminated polydiorganosiloxanes using a variety of catalysts are sufficiently well described in the literature that a detailed description in this specification is not necessary. When ammonia is used as the catalyst, the polymerization reaction of the cyclic diorganosiloxane is typically conducted at temperatures of from 25° to about 100° C. until the desired molecular weight is achieved.

The Curing Agent (Ingredient B)

The polydiorganosiloxane (ingredient A) is cured by a hydrosilation reaction between the vinyl radicals of this ingredient and the silicon-bonded hydrogen atoms of the organohydrogensiloxane, referred to hereinafter as ingredient B. Ingredient B contains an average of more than two silicon bonded hydrogen atoms per molecule. It can contain an average of from 3 up to 20 or more silicon atoms per molecule and exhibits a viscosity of up to 10 Pa.s or higher at 25° C. Ingredient B contains repeating units of the formulae HSiO$_{1.5}$, R''HSiO and/or R''$_2$HSiO$_{0.5}$. The molecules of ingredient B can also include one or more monoorganosiloxane, diorganosiloxane, triorganosiloxy and SiO$_2$ units that do not contain silicon bonded hydrogen atoms. In these formulae R'' is a monovalent hydrocarbon radical containing from 1 to about 20 carbon atoms or a fluorinated hydrocarbon radical selected from the same group as the R' radical of ingredient A. Alternatively, ingredient B can be a cyclic compound containing diorganosiloxane and organohydrogensiloxane units or a compound of the formula Si(OSiR''$_2$H)$_4$.

To ensure compatibility between ingredients A and B, at least a portion of the radicals represented by R'' should be identical to the majority of the hydrocarbon radicals present in ingredient A. When ingredient A is the preferred polydiorganosiloxane containing methyl-3,3,3-trifluoropropylsiloxane units, at least a portion of the R'' radicals should represent 3,3,3-trifluoropropyl radicals. Most preferably ingredient B is a linear dimethylhydrogensiloxy terminated polyorganosiloxane containing from one to about three repeating units per molecule, all of which correspond to the general formula

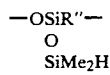

where R" represents 3,3,3-trifluoropropyl and Me represents methyl.

The molecular weights of ingredients A and B together with the number and distribution of the silicon-bonded hydrogen atoms in ingredient B will determine the location of crosslinks in the cured gel. The concentration of crosslinks per unit area is often referred to as the "crosslink density" and determines certain physical properties of the cured gel, particularly hardness and resiliency. The particular types and amounts of ingredients A and B yielding a desired combination of physical properties can readily be determined by routine experimentation with a knowledge of this invention.

The molar ratio of silicon bonded hydrogen atoms to vinyl or other ethylenically unsaturated hydrocarbon radicals present in the curable compositions of this invention is a major factor in determining the properties of the cured gel. As disclosed hereinbefore, a preferred type of organosiloxane gels is prepared from curable compositions containing a stoichiometric excess of vinyl radicals relative to silicon bonded hydrogen atoms. In the present compositions this ratio is typically from 0.4 to 0.8 silicon bonded hydrogen atoms per vinyl radical. The preferred ratio for a given composition will be determined at least in part by the average molecular weight of ingredient A and the type of organohydrogensiloxane curing agent.

The Platinum-Containing Catalyst

Hydrosilylation reactions are typically conducted in the presence of a catalyst that is a platinum group metal or a compound of one of these metals. Platinum compounds such as hexachloroplatinic acid, and particularly complexes of these compounds with relatively low molecular weight, liquid vinyl-containing organosiloxane compounds, are preferred catalysts because of their high activity and compatibility with the organosiloxane reactants. These complexes are described in U.S. Pat. No. 3,419,593 that issued to David N. Willing on Dec. 31, 1968. Complexes wherein the silicon bonded hydrocarbon radicals are vinyl and either methyl or 3,3,3-trifluoropropyl are particularly preferred because of their ability to catalyze a rapid curing of the elastomer at temperatures of at least about 70° C. A particularly preferred catalyst of this type is the complex formed by reacting hexachloroplatinic acid with a liquid dimethylvinylsiloxy terminated poly(methyl-3,3,3-trifluoropropyl)siloxane.

The platinum-containing catalyst can be present in an amount equivalent to as little as one part by weight of platinum per one million parts of curable composition. Catalyst concentrations equivalent to from 3 to 10 parts of platinum per million of curable composition are preferred to achieve a practical curing rate. Higher concentrations of platinum provide only marginal improvements in curing rate, and are therefore economically unattractive, particularly when the preferred catalysts are used.

Preparation of Curable Compositions

The one-part compositions of this invention are typically prepared by blending the foregoing ingredients A, B and C together with at least one of the present catalyst inhibitors and copper acetylacetonate to form a homogeneous composition. The inhibitor allows the composition to be stored under ambient conditions for a period of several days up to several months, depending upon the type and concentration of inhibitor. When it is desired to cure a composition, it is heated at a temperature of about 100° C. or above until the desired degree of curing has been achieved. Temperatures of about 150° C. are preferred.

To ensure against formation of small gel particles in the curable composition it is preferred to prepare the present compositions by blending the present catalyst inhibitor with the platinum-containing catalyst and a portion of the liquid diorganosiloxy-terminated polydiorganosiloxane to facilitate blending. The resultant mixture is then combined with a homogeneous mixture of the remaining diorganosiloxy-terminated polydiorganosiloxane, the organohydrogensiloxane and the copper acetylacetonate to form a curable composition of this invention.

The degree of curing of the gels formed from the present compositions can be conveniently determined by measuring the distance to which a penetrometer probe of known weight penetrates into the cured gel during a specified period of time. For preferred gels this value is from 3 to 12 mm. using a probe diameter of ⅛ inch (3.2 mm) and a combined probe and plunger weight of 19.5 g. applied for five seconds.

When applied as a thin layer the present fluorosilicone compositions containing N,N,N',N'-tetramethylethylenediamine, cure in as little as 15 minutes at 150° C. It will be understood that the cure time is inversely proportional to curing temperature.

A characteristic feature of at least some of the present compositions is the occurrence of a relatively small increase in viscosity during the first seven days of storage. The total increase amounts to about 10 percent of the initial viscosity. Following this initial increase the viscosity of the composition remains substantially constant throughout the remainder of the storage period, which can be up to six months or longer, depending upon the temperature in the storage area.

The gels obtained by curing the polyorganosiloxane compositions of this invention are useful as potting compounds and conformal coatings, and are particularly useful for coating and encapsulating semiconductor devices and electronic circuits containing these devices. These devices and circuits are susceptible to damage by moisture or other contaminants present at locations where they are installed. The structural integrity of fluorosilicone gels is not adversely affected by temperatures as low as −70° C., and the gels are resistant to liquid hydrocarbons and other types of organic solvents. As discussed in the preceding sections of this specification, the unique advantage of the present catalyst inhibitor in combination with copper acetylacetonate is the resistance to hardening and discoloration exhibited by cured gels when exposed to a temperature of 150° C. for up to 1000 hours.

The following examples demonstrate the criticality of the present limits for the concentration of copper acetylacetonate in curable compositions containing the catalyst inhibitors of this invention. All parts and percentages are by weight unless otherwise specified, and viscosities were measured at 25° C.

Penetration values of the cured gels were measured using a penetrometer manufactured by Precision Scientific Company (Catalog Number 73,510). The standard cones supplied with the instrument were replaced with a brass head with a flat base measuring 3.2 mm in height. The total weight of the shaft and head was 19.5 grams, and the penetration reading was taken five seconds after placing the head on the surface of the cured gel.

EXAMPLE 1

The effect of copper acetylacetonate and N,N,N',N'-tetramethylethylenediamine on the properties of cured fluorosilicone gels was evaluated by blending these ingredients together with the following ingredients to form a one-part a curable polyorganosiloxane composition:

1. a mixture (A) consisting essentially of 100 parts of a dimethylvinylsiloxy terminated poly(methyl-3,3,3-propyl)siloxane containing 1.05% of vinyl radicals and exhibiting a viscosity of $1.4 \times 10^{-3}$ m$^2$/sec. and 0.2 part of a complex prepared by the reaction of hexachloroplatinic acid with a liquid dimethylvinylsiloxy terminated poly(methyl-3,3,3-trifluoropropyl)siloxane. The complex contained 0.67% platinum. The polysiloxane had been prepared by the ammonia catalyzed polymerization of 2,4,6-trimethyl-2,4,6-tris(3,3,3-trifluoropropyl)-cyclotrisiloxane followed by reaction of the resultant silanol terminated polydiorganosiloxane with sym-tetramethyldivinyldisilazane; and 2. a mixture consisting essentially of (a) 92.5 parts of the polysiloxane present in mixture 2, (b) 7.5 parts of an organohydrogensiloxane curing agent represented by the average formula

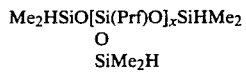

where

Me represents a methyl radical, Prf represents a 3,3,3-trifluoropropyl radical, the average value of x is between 1 and 3, inclusive, and the silicon bonded hydrogen content is 0.67%, and (c) 0.04 part of 2-methyl-3-butyn-2-ol;

the amounts specified in the Table 1 of N,N,N',N'-tetramethylethylenediamine (TMEDA) as a 0.1 percent solution in a silanol-terminated poly(methyl-3,3,3-trifluoropropyl)siloxane exhibiting a viscosity of $3 \times 10^{-4}$ m$^2$/sec, as the heat stabilizer for the cured gel the amount of copper acetylacetonate (CuAcAc) specified in Table 1 as a 60 weight percent dispersion in a silanol-terminated poly(methyl-3,3,3-trifluoropropyl)-siloxane exhibiting a viscosity of $1 \times 10^{-2}$ m$^2$/sec The molar ratio of silicon-bonded hydrogen atoms to vinyl radicals present in the curable composition is recorded in Table 1.

The storage stability of the compositions was evaluated by measuring the viscosity of 50 gram samples of the compositions following storage at 25° C. for 34 days.

Fifty gram samples of the curable compositions were placed in an oven maintained at a temperature of 150° C. for the time periods indicated in Table 1, and the penetration value of the resultant gel was measured. These penetration values are recorded in Table 1. Samples 1C, 5C, 6C and 7C were controls evaluated for comparative purposes.

TABLE 1

| | Sample No. | | | | | | |
|---|---|---|---|---|---|---|---|
| | 1C | 2 | 3 | 4 | 5C | 6C | 7C |
| Mixture 1 (parts) | 36.51 | 36.50 | 34.70 | 34.70 | 34.68 | 50 | 50 |
| Mixture 2 (parts) | 33.09 | 33.1 | 34.97 | 34.89 | 35.00 | 45.00 | 45 |
| SiH/Vinyl Ratio | 0.43 | 0.43 | 0.48 | 0.48 | 0.48 | 0.43 | 0.43 |
| TMEDA (ppm) | 4.7 | 4.7 | 4.6 | 4.6 | 4.6 | 4.6 | None |
| Methylbutynol (ppm) | 189 | 189 | 200 | 200 | 200 | 180 | 180 |
| CuAcAc (ppm) | 0.025 | 0.007 | 0.007 | 0.0035 | None | None | 0.05 |
| Viscosity after 34 Days @ 25° C. (m$^2$/sec $\times 10^{-4}$) | 11 | 7.2 | 7.4 | 9.8 | 10.8 | 10 | Gelled |
| Penetration (mm) After n Hours @ 150° C. | | | | | | | |
| n = | | | | | | | |
| 1 | 11.5 | 18.0+ | ND | ND | ND | ND | 2.6 |
| 4 | 2.5 | 18.0+ | 16.0 | 17.0 | 7.0 | 18.0+ | 4.2 |
| 292 | 1.4 | 7.5 | 3.0 | 4.8 | 5.0 | 18.0+ | 4.6 |
| 388 | 1.5 | 8.0 | 3.2 | 5.1 | 4.4 | 18.0+ | 4.5 |
| 556 | 1.5* | 8.5 | 3.9 | 5.5 | 1.5 | 14.0 | 4.5 |
| 892 | 1.0 | 9.5 | 3.5 | 5.4 | 0.5 | 2.5 | 3.6 |
| 1060 | 1.5 | 10.5 | 2.8 | 5.0 | 0.2 | 0.4 | 3.7 |

*Very discolored
N.D. = Not Determined

The data in Table 1 demonstrate the beneficial effect of copper acetylacetonate in inhibiting heat-induced hardening and discoloration of the cured gel when used at the concentration levels of the present invention, specifically below 0.2 part per million. When the copper compound was omitted (sample 5C) the penetration of the cured gel decreased from 7 to 1.5 mm over 556 hours. Sample 6C demonstrates what occurs when the molar ratio of silicon-bonded hydrogen atoms to vinyl radicals is reduced in an attempt to prepare a softer gel without using copper acetylacetonate. In this instance the gel was only partially cured after 556 hours at 150° C.

When the copper compound was used at the lowest level recommended in the prior art (0.025ppm), the penetration value of the cured gel after 292 hours at 150° C. was only 1.4 mm, compared to minimum of 3.0 for gels prepared using the present compositions. In addition, sample 1C was highly discolored whereas the present gels were colorless to light tan in color.

Sample 7C demonstrates that the concentration levels of copper acetylacetonate taught in the aforementioned Rasch and Fiedler patent effectively inhibit heat-induced hardening of the cured gel when the alkylene diamine is not present as a catalyst inhibitor.

EXAMPLE 2

This example demonstrates the effect of methylbutynol concentration on the penetration value of cured gels produced using the present curable compositions.

The penetration value of gels prepared from the present one-part compositions was determined using compositions prepared as described in the preceding Example 1. Mixtures 1 and 2 and the TMEDA solution are described in Example 1, and the copper acetylacetonate was added as a 37.5 weight percent dispersion in a silanol-terminated poly(methyl-3,3,3-trifluoropropyl)siloxane exhibiting a viscosity of $1 \times 10^{-2}$ m²/sec. The concentration of TMEDA in all samples was 4.5 ppm.

The cured gel was heated at 150° C. and penetration values were determined at the elapsed time values indicated in the following table.

The polydiorganosiloxane used in mixtures 1 and 2 described in Example 1 is referred to as ingredient A in the following Table and the organohydrogensiloxane used in mixture 2 is referred to as ingredient B.

TABLE 2

|  | Sample No. | | | |
| --- | --- | --- | --- | --- |
|  | 1 | 2 | 3 | 4 |
| Mixture 1 | 73.6 | 70 | 73.6 | 70 |
| Mixture 2 | 66.4 | 70 | 0 | 0 |
| Ingredient A | 0 | 0 | 61.42 | 64.75 |
| Ingredient B | 0 | 0 | 4.96 | 5.23 |
| Methylbutynol (ppm) | 188 | 200 | None | None |
| CuAcAc | 0.007 | 0.0035 | 0.007 | 0.0035 |
| Viscosity (m/sec 2 × 10⁻⁴) After n days @ 25° C. | | | | |
| n = | | | | |
| 5 | 6.7 | 6.3 | 15.6 | 11.9 |
| 10 | 20.9 | 13.1 | 29.1 | 21.5 |
| Penetration Value (mm) after h hours @ 150° C. | | | | |
| h = | | | | |
| 2.5 | 18.0+ | 15.5 | 11.5 | 7.2 |
| 8 | 17.5 | 11.5 | 6.5 | 5.4 |
| 29 | 13.5 | 10.0 | 6.0 | 4.4 |
| 100 | 12.0 | 8.0 | 5.9 | 4.3 |
| 340 | 11.0 | 5.5 | 6.2 | 3.9 |
| 508 | 10.6 | 6.0 | 5.8 | 2.9 |
| 676 | 10.5 | 7.0 | 5.0 | 3.0 |
| 1060 | 10.5 | 6.5 | 5.4 | 3.3 |

The data in the preceding Table 2 demonstrate that in all instances the presence of methylbutynol in the curable composition produced a softer gel (a higher penetration value). This is desirable for many end use applications of the gel, particularly as an encapsulant for delicate electronic devices.

That which is claimed is:

1. In a one-part liquid fluorosilicone composition that cures to a gel by means of a platinum-catalyzed hydrosilylation reaction when heated, is stable for prolonged periods of time under ambient conditions and consists essentially of the product obtained by blending A. a liquid diorganovinylsiloxy terminated polydiorganosiloxane wherein at least 25 percent of the silicon atoms are bonded to a fluorine-containing hydrocarbon radical;

B. a compatible liquid organohydrogensiloxane containing fluorinated hydrocarbon radicals bonded to silicon and an average of more than two silicon bonded hydrogen atoms per molecule, the amount of said organohydrogensiloxane being sufficient to provide a molar ratio of silicon bonded hydrogen atoms to vinyl radicals in said composition of from 0.5 to 1.0;

C. an amount sufficient to promote curing of said composition of a platinum-containing catalyst; and D. from 1 to 100 parts by weight per million parts by weight of said composition of at least one N,N,N',N'-tetraalkyl alkylenediamine as the platinum catalyst inhibitor, where the alkyl portion of the diamine contains from 1 to 4 carbon atoms, the alkylene portion contains from 2 to 4 carbon atoms, and the amount of inhibitor is sufficient to inhibit curing of said composition in bulk form at 25° C. without impairing the ability of said composition to cure at temperatures above 100° C., the improvement comprising the presence in said composition of E. from 0.003 to 0.007 percent, based on the weight of said composition, of copper acetylacetonate to inhibit discoloration and heat-induced hardening of cured gels formed from said composition.

2. A composition according to claim 1 where said platinum catalyst inhibitor is N,N,N',N'-tetramethylethylenediamine.

* * * * *